United States Patent
Lücking

(10) Patent No.: US 11,783,659 B2
(45) Date of Patent: Oct. 10, 2023

(54) METHOD AND DEVICE FOR STORING INFORMATION ABOUT OBJECTS FED TO A SELF-SERVICE TERMINAL

(75) Inventor: Oliver Lücking, Paderborn (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 864 days.

(21) Appl. No.: 12/988,678

(22) PCT Filed: Mar. 18, 2009

(86) PCT No.: PCT/EP2009/053213
§ 371 (c)(1),
(2), (4) Date: Oct. 20, 2010

(87) PCT Pub. No.: WO2009/130093
PCT Pub. Date: Oct. 29, 2009

(65) Prior Publication Data
US 2011/0042178 A1   Feb. 24, 2011

(30) Foreign Application Priority Data
Apr. 22, 2008   (DE) .......................... 102008020208.8

(51) Int. Cl.
*G07D 11/30* (2019.01)
*G07D 11/34* (2019.01)
(Continued)

(52) U.S. Cl.
CPC ............. *G07D 11/30* (2019.01); *G06Q 20/10* (2013.01); *G06Q 20/1085* (2013.01);
(Continued)

(58) Field of Classification Search
CPC ............. G07D 7/0093; G07D 11/0003; G07D 11/0006; G07D 11/0009; G07D 11/0012;
(Continued)

(56) References Cited

U.S. PATENT DOCUMENTS 5,804,804 A * 9/1998 Fukatsu ............. G07D 11/0054
180/169
6,065,672 A * 5/2000 Haycock ................ G07D 11/34
235/379
(Continued)

FOREIGN PATENT DOCUMENTS

CN   1573829 A   2/2005
CN   1839414 A   9/2006
(Continued)

OTHER PUBLICATIONS

International Preliminary Reporton Patentability for PCT/EP2009/053213 (dated Nov. 18, 2010) with English translation (29 pages).
(Continued)

*Primary Examiner* — Jeffrey A Shapiro
(74) *Attorney, Agent, or Firm* — Black McCuskey

(57) ABSTRACT

A method for saving information about objects to be verified that were consigned to a self-service terminal and that were deposited by the self-service terminal in cassettes, with the following steps:
- acceptance of objects;
- verification of the objects;
- if verification was not successful, determination of a clear identification of the non-verified object and
- saving the identification on a memory system that is physically connected to the cassette and is transported with said cassette.

7 Claims, 1 Drawing Sheet

US 11,783,659 B2
Page 2

(51) Int. Cl.
*G07D 11/24* (2019.01)
*G07D 11/36* (2019.01)
*G06Q 20/10* (2012.01)
*G07D 11/32* (2019.01)
*G07F 19/00* (2006.01)

(52) U.S. Cl.
CPC ............ *G07D 11/24* (2019.01); *G07D 11/32* (2019.01); *G07D 11/34* (2019.01); *G07D 11/36* (2019.01); *G07F 19/209* (2013.01)

(58) Field of Classification Search
CPC ........... G07D 11/0015; G07D 11/0021; G07D 11/0024; G07D 11/0027; G07D 11/003; G07D 11/0033; G07D 11/0051; G07D 11/0054; G07D 11/0057; G07D 11/006; G07D 11/0066; G07D 11/0069; G07D 11/0072; G07D 11/0075; G07D 11/0078; G07D 11/0093; G07D 11/10; G07D 11/12; G07D 11/125; G07D 11/13; G07D 11/135; G07D 11/16; G07D 11/20; G07D 11/22; G07D 11/225; G07D 11/235; G07D 11/24; G07D 11/245; G07D 11/25; G07D 11/28; G07D 11/30; G07D 11/32; G07D 11/34; G07D 11/36; G06Q 20/20; G06Q 20/22; G06Q 20/223; G06Q 20/227; G06Q 20/229; G06Q 20/2295; G06Q 20/24; G06Q 20/26; G06Q 20/28; G06Q 20/29; G06Q 20/30; G06Q 20/00; G06Q 20/02; G06Q 20/023; G06Q 20/027; G06Q 20/04; G06Q 20/042; G06Q 20/0425; G06Q 20/045; G06Q 20/047; G06Q 20/06; G06Q 20/065; G06Q 20/0652; G06Q 20/0655; G06Q 20/0658; G06Q 20/08; G06Q 20/085; G06Q 20/0855; G06Q 20/10; G06Q 20/102; G06Q 20/105; G06Q 20/108; G06Q 20/1085; G06Q 20/12; G06Q 20/123; G06Q 20/1235; G06Q 20/127; G06Q 20/14; G06Q 20/145; G06Q 20/16; G06Q 20/18; G06Q 20/34; G06Q 20/341; G06Q 20/3415; G06Q 20/342; G06Q 20/343; G06Q 20/3433; G06Q 20/3437; G06Q 20/346; G06Q 20/347; G06Q 20/348; G06Q 20/349; G06Q 20/35; G06Q 20/351; G06Q 20/352; G06Q 20/353; G06Q 20/354; G06Q 20/355; G06Q 20/3552; G06Q 20/3555; G06Q 20/3558; G06Q 20/356; G06Q 20/3563; G06Q 20/3567; G06Q 20/357; G06Q 20/3572; G06Q 20/3574; G06Q 20/3576; G06Q 20/35765; G06Q 20/36; G06Q 20/363; G06Q 20/367; G06Q 20/3672; G06Q 20/3674; G06Q 20/3676; G06Q 20/3678; G06Q 20/38; G06Q 20/381; G06Q 20/382; G06Q 20/3821; G06Q 20/38215; G06Q 20/3823; G06Q 20/3825; G06Q 20/3827; G06Q 20/3829; G06Q 20/383; G06Q 20/384; G06Q 20/385; G06Q 20/386; G06Q 20/387; G06Q 20/388; G06Q 20/389; G06Q 20/40; G06Q 20/401; G06Q 20/4012; G06Q 20/4014; G06Q 20/40145; G06Q 20/4015; G06Q 20/40155; G06Q 20/4016; G06Q 20/4018; G06Q 20/403; G06Q 20/4033; G06Q 20/4037; G06Q 20/405; G06Q 20/407; G06Q 20/409; G06Q 20/4093; G06Q 20/4097; G06Q 20/40975; G06Q 20/42; G06Q 20/425
USPC .................. 209/534; 194/206, 207; 235/379; 902/7–17
See application file for complete search history.

(56) References Cited

U.S. PATENT DOCUMENTS

| | | | | |
|---|---|---|---|---|
| 6,289,261 B1* | 9/2001 | Heidel | ............... | G07D 11/0006 109/23 |
| 6,293,867 B1* | 9/2001 | Heidel | ............... | G07D 11/0006 209/534 |
| 6,308,887 B1* | 10/2001 | Korman | ................. | G06Q 20/18 235/379 |
| 6,332,099 B1* | 12/2001 | Heidel | ............... | G07D 11/0006 221/13 |
| 7,006,664 B2* | 2/2006 | Paraskevakos | ...... | G07D 7/0033 382/100 |
| 7,455,219 B2* | 11/2008 | Langlotz | ............ | G07D 11/0006 235/379 |
| 7,699,153 B2* | 4/2010 | Ehrich et al. | ................. | 194/206 |
| 7,849,993 B2* | 12/2010 | Finkenzeller et al. | ........ | 194/206 |
| 8,162,125 B1* | 4/2012 | Csulits et al. | ................ | 194/206 |
| 8,172,131 B2* | 5/2012 | Langlotz | ............ | G07D 11/0006 235/379 |
| 8,204,293 B2* | 6/2012 | Csulits | ..................... | G07D 7/00 235/379 |
| 8,380,573 B2* | 2/2013 | Jones | ..................... | G06K 9/033 235/379 |
| 8,625,875 B2* | 1/2014 | Csulits | ..................... | G07D 7/00 235/379 |
| 2002/0016771 A1* | 2/2002 | Carothers et al. | .............. | 705/43 |
| 2003/0085271 A1* | 5/2003 | Laskowski | ..................... | 235/379 |
| 2003/0118228 A1* | 6/2003 | Mennie et al. | ................ | 382/135 |
| 2003/0154165 A1* | 8/2003 | Horn et al. | ..................... | 705/39 |
| 2003/0168849 A1* | 9/2003 | Reinisch | ......................... | 283/72 |
| 2003/0217005 A1* | 11/2003 | Drummond | ............. | G06F 3/023 705/43 |
| 2004/0028266 A1* | 2/2004 | Jones | ...................... | G07D 7/20 382/135 |
| 2004/0182678 A1* | 9/2004 | Ina et al. | ...................... | 194/207 |
| 2004/0199924 A1* | 10/2004 | Ganesh et al. | ................. | 719/313 |
| 2004/0205025 A1* | 10/2004 | Takeuchi et al. | ................ | 705/44 |
| 2004/0245066 A1* | 12/2004 | Ichikawa et al. | ............. | 194/206 |
| 2004/0260650 A1* | 12/2004 | Nagaya et al. | ................ | 705/43 |
| 2005/0139447 A1* | 6/2005 | Minamishin et al. | ........ | 194/206 |
| 2005/0183928 A1* | 8/2005 | Jones | ................ | G07D 11/50 194/207 |
| 2005/0207634 A1* | 9/2005 | Jones | ..................... | G06Q 20/18 382/135 |
| 2006/0065717 A1* | 3/2006 | Hurwitz | ............... | G06Q 20/023 235/381 |
| 2006/0136301 A1* | 6/2006 | Grovit | ............. | 705/16 |
| 2006/0205481 A1* | 9/2006 | Dominelli | .............. | G06Q 20/06 463/25 |
| 2006/0212372 A1 | 9/2006 | Eberhard et al. | | |
| 2007/0122023 A1* | 5/2007 | Jenrick et al. | ................. | 382/135 |
| 2007/0229253 A1* | 10/2007 | Langlotz | ............ | G07D 11/009 340/540 |
| 2008/0011840 A1* | 1/2008 | MacKenzie | ............ | G07D 11/30 235/385 |
| 2008/0195540 A1* | 8/2008 | Gee | ..................... | G06Q 20/1085 705/43 |
| 2008/0219543 A1* | 9/2008 | Csulits | ..................... | G07D 7/00 382/135 |
| 2008/0223930 A1* | 9/2008 | Rolland | ............... | G06Q 10/087 235/385 |
| 2008/0236990 A1* | 10/2008 | Ehrich | .................. | G07D 11/30 194/207 |
| 2008/0285838 A1* | 11/2008 | Jones | ..................... | G06K 9/033 382/135 |
| 2008/0301049 A1* | 12/2008 | Dyson | ..................... | G07F 19/20 705/42 |

(56) References Cited

U.S. PATENT DOCUMENTS

| | | | |
|---|---|---|---|
| 2009/0055017 A1* | 2/2009 | Langlotz | G07D 11/0006 700/213 |
| 2009/0078756 A1* | 3/2009 | Oberan | G07F 17/42 235/379 |
| 2009/0222362 A1* | 9/2009 | Stood | G06Q 40/00 705/30 |
| 2010/0065623 A1* | 3/2010 | Sauter | G07D 11/135 232/1 D |
| 2010/0288831 A1* | 11/2010 | Graef et al. | 235/379 |
| 2011/0011778 A1* | 1/2011 | Inoue | G07D 11/0012 209/534 |
| 2012/0150745 A1* | 6/2012 | Csulits | G07D 7/00 705/45 |
| 2012/0321170 A2* | 12/2012 | Jones | G06K 9/033 382/135 |

FOREIGN PATENT DOCUMENTS

| | | |
|---|---|---|
| CN | 1636222 A | 4/2010 |
| DE | 20011602 U1 | 11/2000 |
| DE | 101 63 267 A1 | 7/2003 |
| DE | 10360858 A1 | 7/2005 |
| DE | 102004018599 A1 | 11/2005 |
| DE | 102007014176 A1 | 8/2008 |
| WO | WO-99/05624 A1 | 2/1999 |
| WO | WO-2005/001779 A1 | 1/2005 |
| WO | WO-2005/064553 A1 | 7/2005 |
| WO | WO-2008-092754 A1 | 8/2008 |

OTHER PUBLICATIONS

English translation of Chinese Office Action for Application No. 2009-80114137.7 dated Nov. 5, 2012 (16 pages).

European Examination Report for EP 09 733 697.8 dated Apr. 29, 2013 (11 pages).

Wincor Nixdorf, "Modular Software Portfolio Maps Retail Banking Processes" (Jan. 29, 2008). Wincor Nixdorf Press Archive 2008.

Office Action dated Feb. 2, 2018 in the parallel Chinese divisional application No. 201510024933.9.

Corresponding International Application Publication WO 03/040881 A2, dated May 15, 2013, provided as an English translation to CN 1636222A.

* cited by examiner

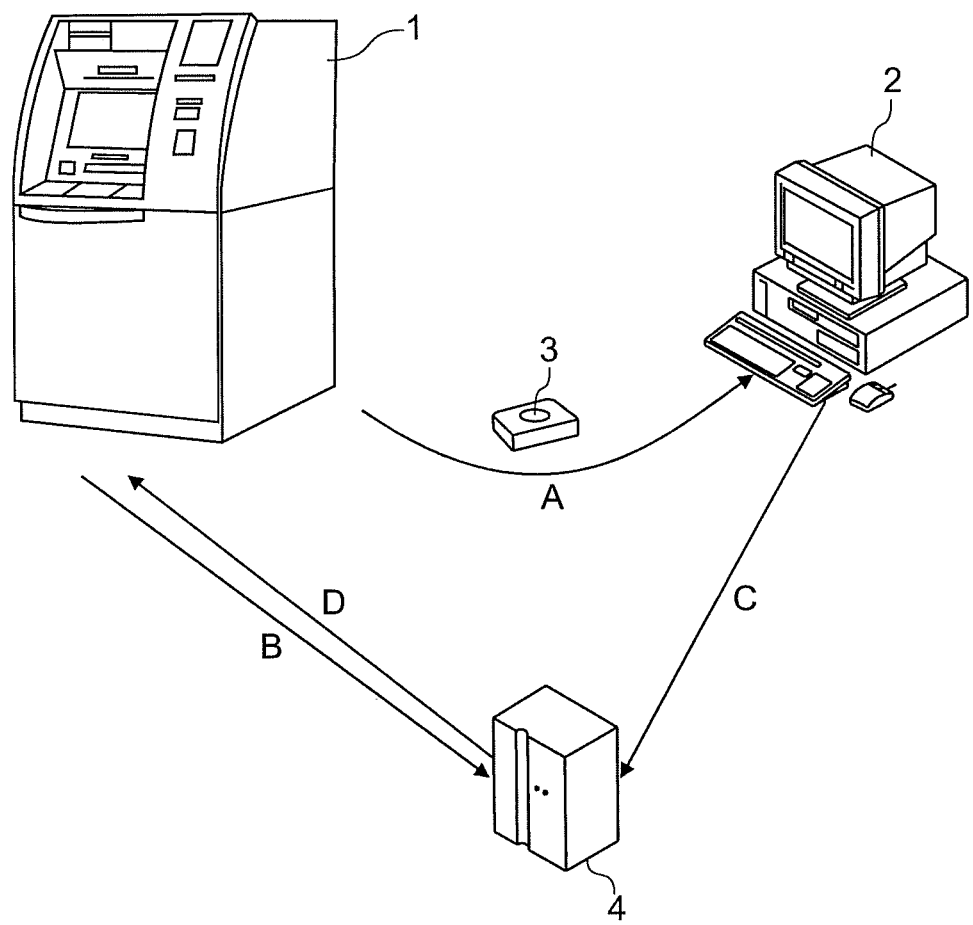

METHOD AND DEVICE FOR STORING INFORMATION ABOUT OBJECTS FED TO A SELF-SERVICE TERMINAL

CROSS-REFERENCE TO RELATED APPLICATIONS

This application is a National Stage of International Application No. PCT/EP2009/053213, filed Mar. 18, 2009. This application claims the benefit and priority of German application 102008020208.8, filed Apr. 22, 2008. The entire disclosures of the above applications are incorporated herein by reference.

BACKGROUND

This section provides background information related to the present disclosure which is not necessarily prior art.

Technical Field

The invention relates to methods for storing information about objects to be verified that were consigned to a self-service terminal and that were deposited in cassettes by the self-service terminal, and specifically cassettes in which objects were deposited.

Discussion

Traditional self-service terminals/automats for accepting objects such as money, checks, letters, packages, objects with deposits, accept objects, then inspect them and perform a transaction based on these objects. In order to operate, these self-service terminals have a user interface through which information for the transaction is stored. In the case of monetary transactions, for example, the user or customer requires an EC card (account identity card) or a keypad in order to indicate the target account or an unambiguous user name and additional information as required.

These self-service terminals often have automatic detection to detect counterfeit objects. For example, if counterfeit money is detected, a signature (generally the serial number with the time and customer details) is saved in the automat, the money goes to the central office using a cassette and is inspected there once more. If money is found to be counterfeit here as well, the note must be inspected once again at the same dispenser in order to discover the details of the transaction, specifically its origin.

The signature saved in the self-service terminal must be linked to a transaction by way of the time stamp, the customer for the transaction can then be identified. An additional problem in this matter is that the time stamp (automat, host) may display differences that make a simple match more difficult.

SUMMARY OF THE INVENTION

An object of the invention is efficient transmission and management of information about counterfeit objects that have been consigned to a self-service system.

Even if reference is made in what follows to banknotes, the examples can be applied to other self-service terminals that accept, for example, checks, letters, packages, deposit objects. The formulations that follow thus do not represent any restriction.

The object is achieved by writing information referring to the counterfeit objects determined by the self-service terminal on a storage medium that is physically connected to a cassette (for example, a money cassette, bottle crate). The serial number is preferably stored in the cassette. Then the money is brought to the central office with the cassette. A second inspection is made here and if counterfeit money is discovered, the serial number is read from the cassette memory. At the automat the serial number is now linked to the transaction by a time stamp, the customer can now be identified for this transaction.

In a further embodiment, additional data are filed besides the serial number of the counterfeit money. In the preferred embodiment, information is saved in addition to the serial number, that permits a clear identification of the transaction without accessing the cash machine again.

In this case, for example, a central system is accessed that provides additional details about the transaction from the transaction number, such as time of day, name, person, target account, etc.

Using this approach, the transaction number can be linked directly to the customer. The customer can then be queried directly, for example by the money service provider at the bank, or in the event of counterfeit money, delivered directly to the authorities. The service provider can additionally be connected directly to the bank system, or he forwards only the transaction number.

It is no longer necessary to visit the cash machine. Time stamps no longer play a part.

The information about the transaction can be further processed through a central management network for self-service terminals. For example, ProClassic/Enterprise (PC/E) from Wincor Nixdorf (the applicant) possesses all the features that are required to set up a fully integrated multi-channel strategy. It allows the user to optimize across channels. To do this, the technology creates a net-centric architecture that transfers the business logic of all decentralized end devices to a central server. In addition to the various channels, the application integrates all self-service systems from different makers. The transition to a net-centric architecture takes places smoothly. Existing and new infrastructures are supported by the open software, i.e. the individual end devices can be converted gradually. Processes in particular in which the processing of transactions is handled internally at the bank are optimized with PC/E through the flexible integration of backend systems.

The open architecture of PC/E is based in the present instance on the vendor-independent standard J2EE. It is implemented on the infrastructure of J2EE-compliant application servers that optimally support net-centric solutions through their scalability.

In the environment of PC/E, the signatures could be transmitted to the PC/E server, as the service providers do not necessarily have direct access to the system the use of the transaction number in the cassettes is also a solution. Many host systems do not pass on a transaction number under certain circumstances, in this case the management system (PC/E) generates its own number that can be used. Either the transaction number is linked by the self-service system with a counter (unambiguous identification), or the transaction generated is sent to the self-service system so that said transaction number can be stored in the cassette.

If no type of transaction numbers are provided by the host system, a transaction number can be generated directly through codes on the cash machine, said number is saved in the cassette and has to be transmitted to the host when the transaction is finalized, in this way the simplified workflow can then be used through a new data base query about the new feature since an assignment between self-service system transaction number and host transaction number is given. Basically this method and the corresponding self-service terminals are suitable for checks, letters, packages, deposit return systems, etc., that can receive a transaction number generated by a central computer or from decentralized systems by way of codes. And where subsequent verification is necessary with simultaneous interruption of a purely electronic sequence.

In detail, these are methods to store information about objects to be verified that have been assigned to a self-service terminal and deposited in cassettes by the self-service terminal. The cassettes can comprise bottle crates or other containers that serve to receive the objects. The self-service terminal has transport units to transport the objects automatically into the cassettes that have previously been brought into the self-service terminal via an intake area.

In a preferred embodiment these are money cassettes. The bills are accepted by way of a receiving slot, counted, inspected and deposited in the cassette.

The method comprises the following steps:

The self-service terminal has an area for the automatic acceptance of the objects.

After the objects are received, they are verified. Verification attempts to establish the identity and, if necessary, the authenticity of the object automatically. The inspection is made automatically using standard methods that utilize optical, magnetic or electronic techniques, details of which are known to one skilled in the art.

If verification was not successful, after determination of a positive identification of the non-verified object, identification is saved on a memory system that is physically connected to the cassette and transported with said cassette. It is naturally also conceivable that each transaction is filed on the cassette memory system independently of the verification, i.e. all data are stored here. The memory system on the cassettes can be a magnetic, optical or an electronic memory, such as a silicon memory, in particular a flash memory. The memory can be connected to an integral power supply if this should be necessary. The memory is preferably encoded or provided with signatures to protect it.

The memory is connected to the self-service terminal by a plug connection. One conceivable connection would be USB or Firewire. It is also conceivable that the connection is optical or wireless.

In a preferred embodiment, the transaction number is filed in addition to the identity of the object. The transaction number is configured such that transaction details can be made available through it without the necessity of renewed access to the self-service terminal. That is, it should be possible to acquire further data using the transaction number from a remote computer that has access to the transaction number. This can be managed on the one hand through additional information that is stored on the memory system of the cassette itself, and on the other through a central server system that reconciles the transaction number with the self-service terminal. In some embodiments, images of unambiguous numbers that the self-service terminal has generated are stored on transaction numbers in a data base. This is always necessary if the self-service terminal has no access to the transaction information of the transaction system backing it up. The transaction system or an intervening system then receives an unambiguous code from the self-service terminal that it then links with a transaction number.

It is also conceivable that in the event the self-service terminal does not receive a transaction number from the transaction system, said number could be entered by an external management system, or a number range is used that is managed by the self-service terminal and made available to a database that creates a relationship between number range and transaction number whereby access is created over the database to the transaction number to obtain additional transaction details.

The cassette thus contains all relevant details and, after being removed from the self-service terminal and connected to another system, allows access to relevant information without having to resort to the self-service terminal again.

In the case of counterfeit money, for example, in addition to the serial number of the counterfeit money, the transaction number is saved that automatically allows access to additional transaction details by accessing a central system or additional details that are saved on the memory system.

BRIEF DESCRIPTION OF THE DRAWING

The drawing described herein is for illustrative purposes only of selected embodiments and not all possible implementations, and is not intended to limit the scope of the present disclosure.

FIG. 1 shows a sequence of the method between a self-service terminal, a central server and a computer system that reads the data from a memory system of the cassette.

Corresponding reference numerals indicate corresponding parts throughout the several views of the drawing.

DETAILED DESCRIPTION OF THE PREFERRED EMBODIMENTS

Example embodiments will now be described more fully with reference to the accompanying drawing.

FIG. 1 shows the sequence of the method in accordance with the invention. Money is consigned to a self-service terminal 1 (automated cash machine). Said money is automatically deposited by the cash machine in a cassette 3. Before it is deposited, it is inspected or verified to establish the serial number and if necessary its authenticity. Known techniques are used for this. Simultaneously a transaction number (B) is requested from a transaction server 4 which is then prepared (D) by the transaction server 4. The data determined in this way (transaction number/serial number) are saved on a memory system in the cassette 3. The money cassette is retrieved regularly (A) and the data can be read at a central office by a computer 2 that, when re-analyzing the money and discovering counterfeit money, can read the necessary data from the cassette. If counterfeit money was discovered at the central office, the transaction number can be accessed from the serial number, which are stored together in the cassette. Using the transaction number, the details of the transaction (C) can be queried by the server system 4 to obtain name, time and similar.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for storing information about bank notes to be verified that have been consigned to a self-service terminal by a user and that have been deposited by the self-service terminal in a cassette, comprising the following steps:

a.) accepting, with the self-service terminal, a first plurality of bank notes and information of a user's account;
b.) verifying the first plurality of bank notes and determining whether any of the first plurality of bank notes is nonverified by the self-service terminal;
c.) sending, with the self-service terminal, transaction details associated with said accepting to a central server system in response to said accepting and requesting a transaction number from the central server system;
d.) generating, with the central server system, a transaction number in response to said sending and requesting initiated by the self-service terminal and linking the transaction number to the transaction details;
e.) sending, with the central server system, the transaction number to the self-service terminal and storing the transaction details associated with the transaction number;
f.) saving, with the self-service terminal, the transaction number linked to the first plurality of bank notes, accepted during said accepting, on a memory system that is physically connected to the cassette and is transported with the cassette;
g.) removing the cassette from the self-service terminal and transporting the cassette to a central office;
h.) inspecting, with a computer at the central office, all of the bank notes contained in the cassette, including the first plurality of bank notes, to verify if any of the bank notes contained in the cassette are non-verified;
i.) discovering, with the computer at the central office, a non-verified bank note from among the bank notes contained in the cassette;
j.) reading, with a computer at a central office, after and in response to said discovering, the transaction number linked with the non-verified bank note contained in the cassette from the memory system;
k.) accessing, with the computer at the central office, the transaction details associated with the transaction number from the central server system after said reading the transaction number from the memory system of the cassette; and wherein at least steps d-g are performed sequentially in order.

2. The method of claim 1 wherein said sending is further defined as:
sending, with the self-service terminal, transaction details associated with said accepting, including a time of day and a name of the user and the user's account, to the central server system in response to said accepting and requesting the transaction number from the central server system.

3. The method of claim 1 wherein said verifying further comprises:
determining, at the self-service terminal, that one of the first plurality of bank notes is nonverified in the form of counterfeit.

4. The method of claim 3 said method further comprises:
identifying, at the self-service terminal, a serial number displayed on the one of the first plurality of bank notes identified as counterfeit during said verifying.

5. The method of claim 4 wherein said saving is further defined as:
saving, with the self-service terminal, on the memory system, the transaction number linked to the serial number of the one of the first plurality of bank notes identified as counterfeit during said verifying.

6. The method of claim 5 wherein said saving is further defined as:
saving, with the self-service terminal, on the memory system, the transaction number linked to the serial number of the one of the first plurality of bank notes identified as counterfeit during said verifying with a time stamp.

7. The method of claim 1 wherein said accessing is further defined as:
accessing, with the computer at the central office, the transaction details associated with the transaction number from the central server system after said reading the transaction number from the memory system of the cassette without accessing the self-service terminal again.

\* \* \* \* \*